Oct. 25, 1938.　　G. W. VON HOFE　　2,134,159
VARIABLE SPEED DRIVE
Filed Sept. 4, 1937　　2 Sheets-Sheet 1

INVENTOR.
GEORGE W. VON HOFE
BY
ATTORNEYS.

Oct. 25, 1938.  G. W. VON HOFE  2,134,159
VARIABLE SPEED DRIVE
Filed Sept. 4, 1937  2 Sheets-Sheet 2

INVENTOR.
GEORGE W. VON HOFE
BY
ATTORNEYS.

Patented Oct. 25, 1938

2,134,159

UNITED STATES PATENT OFFICE 2,134,159

VARIABLE SPEED DRIVE

George W. von Hofe, Bound Brook, N. J., assignor to New Jersey Machine Corporation, Hoboken, N. J., a corporation of New Jersey Application September 4, 1937, Serial No. 162,432

1 Claim. (Cl. 74—230.17)

The invention relates to variable speed drives and has for its object to provide a simple arrangement capable of variable speed transmission in an efficient manner. The invention contemplates further the provision of control means whereby variations in the driving speed may be efficiently effected with maximum simplicity and without requiring any particular skill in the operation. Other more specific objects will appear from the description hereinafter and the features of novelty will be pointed out in the claim.

Figure 1:
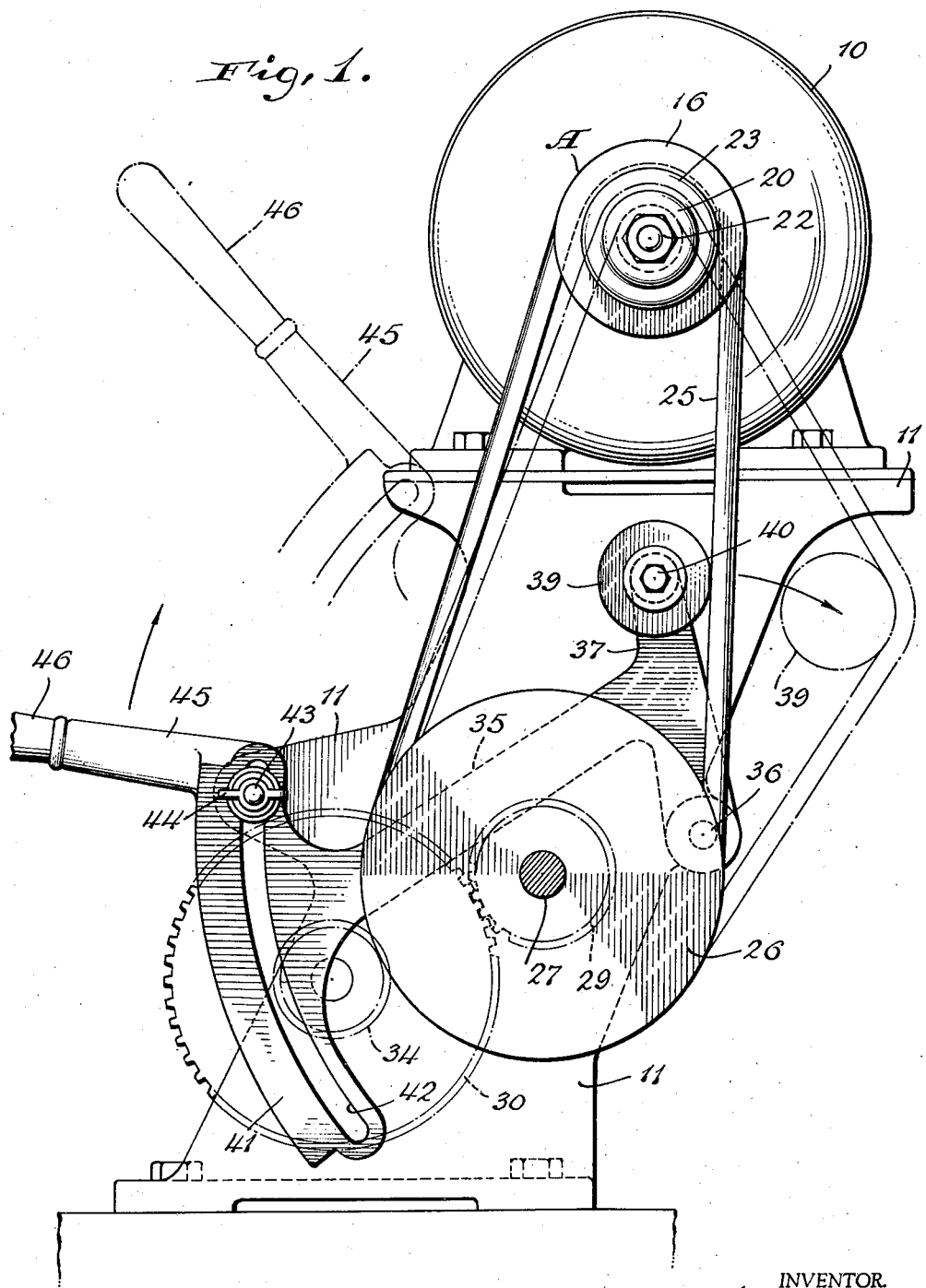
Figure 2:
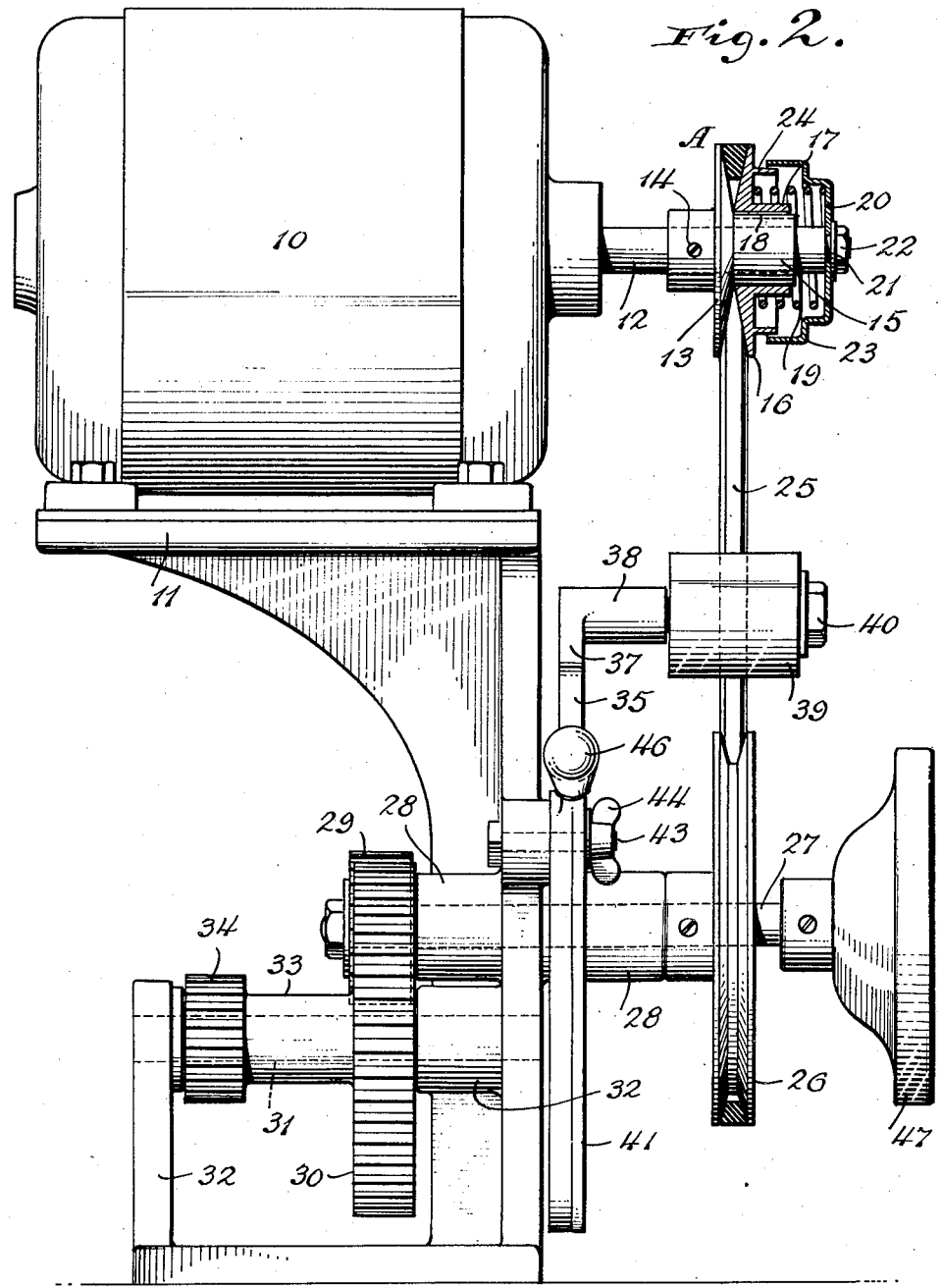

In the accompanying drawings, which illustrate an example of the invention without defining the limits thereof, Fig. 1 is a side elevation of the novel drive, and Fig. 2 is a front elevation thereof, with parts in section.

In the construction selected for the purpose of illustration and description, the means for developing the driving power is exemplified by an electric motor 10 which is mounted in any convenient manner as, for instance, upon a bracket or equivalent support 11. The driving shaft 12 of the motor 10 is provided with a belt pulley A consisting of a main section 13 fixed upon the shaft 12 in any customary manner as by means of a set screw 14 and having a hub 15 extending lengthwise of said shaft 12, as shown in Fig. 2. The aforesaid pulley further comprises an auxiliary section 16 including an axial sleeve 17 projecting lengthwise of the hub 15 in surface engagement therewith. The arrangement is such that the auxiliary section 16 with its sleeve 17 is slidable lengthwise of the hub 15 toward and away from the main section 13, for the purpose to be more fully set forth hereinafter. In addition the auxiliary section 16 is connected with the main section 13 in any suitable manner to rotate therewith without interference with the aforesaid sliding movements of said auxiliary section 16; in the illustrated example the connection is effected by keying the auxiliary section 16 and its sleeve 17 upon the hub 15 as indicated at 18. A coil spring 19 has its one end in engagement with the auxiliary section 16 and its other end in contact with a washer or disk 20 fixed in place upon a reduced end portion 21 of the shaft 12, for instance by means of a nut 22, said spring 19 serving to yieldingly urge the auxiliary section 16 toward the main section 13. As a measure of protection the washer or disk 20 may be provided with an annular flange 23 which projects over an annular flange 24 extending from the auxiliary section 16, said flanges 23 and 24 forming an enclosure for the spring 19, as shown in Fig. 2. The opposed faces of the pulley sections 13 and 16 converge toward the axis of the shaft 12 and in cooperation with each other provide a variable belt groove for the accommodation of a transmission belt 25 which preferably is of inwardly tapering or so-called V-shape in cross-section.

The belt 25 is connected with the peripherally grooved driven pulley 26 which in the illustrated example is fixed upon the driven shaft 27 journalled in bearings 28 provided upon the bracket or other support 11. For the purpose of exemplifying an embodiment of the novel drive, the shaft 27 is provided with a pinion 29 which meshes with a gear 30 fixed upon a counter-shaft 31 journalled in bearings 32 forming part of the bracket 11 or its equivalent. The gear 30 includes a sleeve 33 which at its outer end terminates in a pinion 34 whereby the action of the drive may be transmitted to other co-operating mechanism; it will be understood that the illustrated train of gearing exemplified by the pinion 29, gear 30 and pinion 34 may be replaced by other arrangements adapted to be operatively actuated by the pulley 26.

In addition to the parts so far described, the novel variable speed drive includes control means whereby variations in the driving speed may be easily effected with maximum efficiency at the will of the operator. In its illustrated form the control means comprises a speed adjustment lever consisting of a member 35 pivoted at 36 upon the bracket or equivalent support 11 and provided with an extension 37 from which a bearing 38 projects laterally for rotatably accommodating a roller or belt idler 39, for instance, as shown in the drawings; as shown in the drawings the extension 37 extends to a point between the two runs of the belt 25 and the roller or belt idler 39 thereon is correspondingly located between the belt runs and preferably is removably fixed in place on said extension 37 by means of a nut 40 or its equivalent. The speed adjustment lever, in the illustrated form, further includes a segment 41 located at one end of the member 35 and provided with an arcuate slot 42 curved about the pivot 36 as a center; a screw-threaded pin 43 fixed upon the bracket or equivalent support 11, projects through the slot 42 and accommodates a wing-nut 44 or its equivalent, whereby the speed adjustment lever is secured in an adjusted position for the purpose to be more fully described hereinafter. To facilitate the operation of the speed adjustment lever an operating member 45 preferably terminating in a handle 46 projects from the segment 41 as shown in Fig. 1. The arrangement is such that the roller or belt idler 39 is located inwardly of and in registry or engaging relation and preferably in rolling contact with one run of the belt 25, as illustrated in Figs. 1 and 2. If desired, a hand wheel 47 may be fixed upon the driven shaft 27 for manually manipulating the drive if for any reason this should become necessary.

With the parts in the position shown by full lines in Fig. 1, the pulley section 16 is located in adjacent relation to the section 13 and the belt 25 is located in the outer portion of the belt groove formed by the opposed faces of said sections 13 and 16, as illustrated in Fig. 2. At the same time the operating lever 45 and its handle 46 occupy their lower position with the pin 43 at the upper end portion of the slot 42 and the roller or belt idler 39 located inwardly of any preferably though not necessarily in rolling contact with one run of the belt 25, the latter extending directly and in straight lines between the pulley A on the motor shaft 12 and the pulley 26 on the driven shaft 27. Under such conditions the motor 10 transmits a speed to the pulley 26 which represents a maximum high for a given arrangement of the novel variable speed drive. It will be understood that the wing-nut 44 or its equivalent, is screwed down on the pin 43 to clamp the segment 41 and associated elements of the control means in the adjusted position.

When it is desired to reduce the speed of transmission, for instance, to the minimum for which a given arrangement of the novel variable speed drive is designed, the wing-nut 44 or its equivalent is first loosened to relieve its clamping action on the segment 41 after which the handle 46 and operating member 45 are moved upwardly to correspondingly raise the segment 41 until the pin 43 occupies a position at the lower end of the slot 42. This operation swings the speed adjustment lever on the pivot 36 and shifts the roller or belt idler 39 to the right, for instance, to the position shown by dotted lines in Fig. 1. As the roller or belt idler 39 is thus shifted, it will exert a pressure in a corresponding direction upon the one run of the belt 25 as likewise indicated by dotted lines in Fig. 1; this will develop a tension upon the belt 25 which effects a downward pull upon that part of said belt 25 lying in engagement with the pulley A on the motor shaft 12 and consequently will develop a camming force upon the auxiliary section 16 whereby the latter is shifted in a direction away from the main section 13 against the tension of the spring 19. When the desired adjustment has been effected, the wing-nut 44 or its equivalent is again manipulated to clamp the segment 41 and its associated element against unintentional displacement. At this stage the belt 25 is accordingly located in engagement with the hub 15 at the inner portion of the belt groove formed by the opposed faces of the pulley sections 13 and 16 with the result that the speed of rotation of the pulley 26 is reduced to a speed representing the minimum for said given arrangement of variable speed drive.

Speed changes between the maximum and minimum for which any given arrangement of the novel variable speed drive is designed may be obtained by adjusting the control means to intermediate points and in each instance fixing the same in adjusted position by means of the wing-nut 44 or its equivalent. With each setting of the speed adjustment lever the roller or belt idler 39 acts on the one run of the belt 25 to shift the belt to different portions of the belt groove formed by the opposed faces of the pulley sections 13 and 16; this is possible by reason of the fact that the auxiliary section 16 is axially movable relatively to the main section 13. It will be understood, as the roller or belt idler 39 is shifted back from the dotted line position in Fig. 2 representing low transmission speed to the solid line position representing high speed, that the spring 19 will force the section 16 toward the section 13; in other words, the tension and consequent downward pull on the belt 25 will be relieved and the opposed faces of the pulley sections 13 and 16 under the influence of the spring 19 will develop a camming action on the belt 25 whereby the latter is forced outwardly in the pulley groove formed by said opposed faces. The speed at which the pulley 26 or its equivalent is driven may accordingly be changed from maximum to minimum or to any intermediate point by simply manipulating the handle 46 and operating member 45 and with them the segment 41 and associated elements to cause the roller or belt idler 39 to act on the belt 25 and to adjust the pulley A in a manner to effect the desired results. In other words, a manipulation of the handle 46 and operating member 45 will vary, that is increase or diminish, the tension on the belt 25 and cause adjustment of the movable pulley section 16 relatively to the other pulley section 13 and radial shifting of the belt in the belt groove formed by the opposed surfaces of said sections 13 and 16. It will be understood that the spring 19 or its equivalent acts at all times to maintain the pulley section 16 in proper relation to the pulley section 13 in all settings of the speed adjustment lever.

The arrangement itself is simple in construction, and its operation to effect the desired speed changes requires no particular effort and no particular skill on the part of the operator. The control means may be adjusted while the mechanism of which it forms a part is in operation and variations in driving speed may be effected at will without requiring said mechanism to be stopped. The novel variable speed drive accordingly is quick in action and interposes no undesirable delays in the operation of the machine or mechanism of which it is a part. The novel variable speed drive is capable of wide use and is particularly adapted for use in connection with labeling machines and the like; the novel arrangement may be readily incorporated in existing machines.

Various changes in the specific forms shown and described may be made within the scope of the claim without departing from the spirit of the invention.

I claim:

In a variable speed drive, the combination of a support, a motor carried by said support in fixed position and including a driving shaft, a driving pulley consisting of a main section fixed on said driving shaft and an auxiliary section rotatable with said main section and axially movable relatively thereto, the opposed faces of said pulley sections co-operating to provide a variable belt groove, a spring whereby said auxiliary section is yieldingly urged toward said main section, a driven pulley journalled on said support, a belt connecting said driving and driven pulleys, a member pivoted on said support extending to a point between the runs of said belt, a belt idler carried by said member inwardly of and in engaging relation to one run of said belt, a segment carried by said member and provided with an arcuate slot, a threaded pin on said support projecting through said slot, a handled operating member projecting from said segment whereby said pivoted member is operated to cause said belt idler to force said one run of the belt outwardly to displace the auxiliary section of said driving pulley and radially displace the belt in said belt groove, and a clamping nut threaded on said pin for fixing said segment and said belt idler in adjusted positions.

GEORGE W. von HOFE.